United States Patent [19]

Matuschek et al.

[11] 3,937,123

[45] Feb. 10, 1976

[54] BLIND FASTENER WITH SHEAR WASHER

[75] Inventors: Josip Matuschek, Newport Beach; Johan August Louw, Orange, both of Calif.

[73] Assignee: Textron Inc., Santa Ana, Calif.

[22] Filed: Apr. 8, 1974

[21] Appl. No.: 458,710

[52] U.S. Cl. .............................. 85/72; 85/62; 85/77
[51] Int. Cl.² ..................... F16B 13/06; F16B 33/02
[58] Field of Search ................. 85/77, 78, 72, 62, 7

[56] References Cited
UNITED STATES PATENTS

| | | | |
|---|---|---|---|
| 1,311,473 | 7/1919 | Vossler | 85/50 |
| 3,276,308 | 10/1966 | Bergere | 85/72 |
| 3,277,771 | 10/1966 | Reynolds | 85/72 |
| 3,285,120 | 11/1966 | Kartiala | 85/62 |

Primary Examiner—Ramon S. Britts
Attorney, Agent, or Firm—Harvey C. Nienow

[57] ABSTRACT

A blind fastener wherein a push-pull type setting tool is employed for pulling a stem into a predetermined position relative to a sleeve, and a two element shear washer is provided to fail at a predetermined shear load as created by the compressive load on the sleeve and the reaction tensile pull on the stem. Failure of the shear washer drives a locking collar between the stem and sleeve.

The shear washer comprises a pair of concentric but axially offset elements joined together by an annular shear web which, upon shear failure allows one of the elements to drive an annular locking collar between the stem and sleeve. Such shear washer together with the rivet sleeve are serially placed under compression to counteract the tensile force applied to the stem.

A further control feature consists of mating surfaces on the stem and sleeve which are caused to be engaged when the relative positions of the stem and the sleeve are proper for locking the rivet, such mating surfaces engaging at that time to cause the force on said washer to exceed the maximum shear strength of the web.

8 Claims, 4 Drawing Figures

BLIND FASTENER WITH SHEAR WASHER

The present invention relates generally to blind fasteners but more particularly to such fasteners as are installed by applying a pulling force to one portion of the fastener.

Blind fasteners have been very useful in the manufacture of various different articles and machines, such that today millions of such devices are manufactured and used. Blind fasteners, of course, are fasteners which are applied from only one side of a pair of construction members. Typically, the fastener is inserted from the one access side, and by means of a manual or power operated setting tool is caused to be firmly secured in place.

It has long been the desire to provide a blind fastener which can be properly inserted in place to provide the desired mechanical characteristics as well as pleasing appearance, and which can be installed without the need for special skills by the installer.

Prior devices of this nature have been so constructed as to be dependent on the operator's skill or abilities or, in the alternative, have been dependent on a combination of characteristics of fastener components and special complicated installation tools to make a proper installation.

With these and other shortcomings in mind, it is an object of the present invention to provide a blind fastener which is dependent upon a single variable which is easy to control.

A further object of the present invention is to provide a blind fastener as characterized above which can be easily and effectively installed without the need for unusual or sophisticated setting tools.

Another object of the present invention is to provide a blind fastener as characterized above which can be installed without the need for special skills on the part of the installer and wherein the resulting installation has a pleasing appearance.

An even further object of the present invention is to provide a blind fastener as characterized above wherein a shear washer is employed to define the load at which the locking collar is set on the setting of an installation tool.

An additional object of the present invention is to provide a blind fastener as characterized above which is simple and inexpensive to manufacture and which is rugged and dependable in operation.

The novel features which we consider characteristic of our invention are set forth with particularity in the appended claims. The invention itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 1:
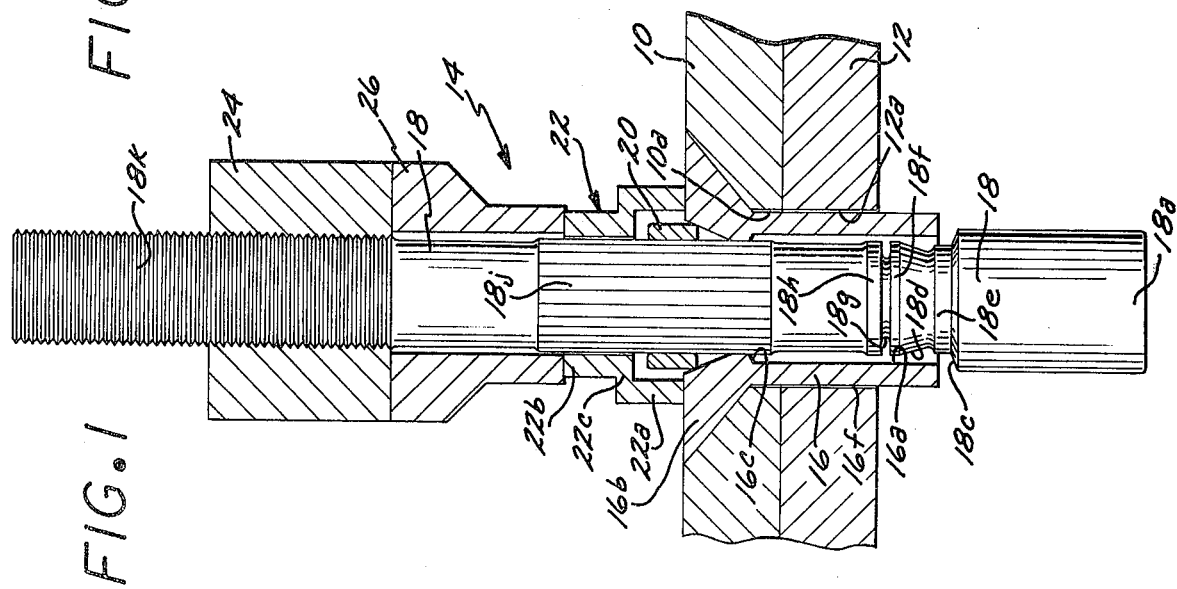
FIG. 1 is a fragmentary sectional view of a fastener according to the present invention and positioned relative to members to be fastened together.

Referring to FIG. 1 of the drawings, there is shown therein a pair of construction members 10 and 12 which represent substantially any two members to be fastened together. A fastening device 14 according to the present invention is provided for firmly securing the members 10 and 12 in adjacent relation as shown, such fastener 14 to be installed from only one side, namely the side adjacent member 10, as will hereinafter become more apparent.

Fastener 14 comprises a sleeve 16 which is generally tubular in construction having a through opening 16a, and comprises an enlarged end portion 16b and a generally cylindrical exterior surface 16E. The enlarged end portion 16b, within the context of the present invention, may have substantially any shape or configuration as will prevent the sleeve 16 from passing through the aligned openings 10a and 12a formed in the construction members 10 and 12. That is, as shown in the drawings, such enlarged end portion 16b may be frusto-conical in design, or it could be cylindrical in shape if desired.

For slidable movement within the opening 16a of sleeve 16, there is provided a stem 18 which is generally cylindrical although having various different cross sectional dimensions there along.

The lower end 18a of stem 18 is preferably cylindrical, and is so related to the cross section of through opening 16a of sleeve 16 as to have an interference fit therewith, to the degree hereinafter explained.

The upper end of cylindrical portion 18a provides an annular shoulder 18c. A tapered portion 18d, with cylindrical portions 18e and 18f on either side thereof is immediately beneath a reduced section or break-notch 18g. Another cylindrical portion 18h is provided above the breaknotch 18g and a splined cylindrical section 18j and serrated section 18k are found in the remaining portion of the stem 18.

Stem 18 may be formed of substantially any desired material such as steel, aluminum, and the like, and, as will hereinafter become more apparent, the lower end portion 18a should be sufficiently hard with respect to the material used in making sleeve 16 to affect expansion or cold forming of such sleeve, and sufficiently ductile to wiredraw and adapt to the space available after expanding the sleeve to fill the hole in the construction members.

For setting or locking of the fastener, the process of which will be hereinafter described, there is provided an annular cylindrically-shaped locking collar 20 which is formed of cold deformable material.

A combination control and setting washer 22 is provided, having a pair of washer elements 22a and 22b which are concentrically arranged but axially offset from each other as shown in the drawings. A shear section 22c is employed in joining together the upper washer element 22b with the lower element 22a as shown in the drawings. As will hereinafter become more apparent, the washer element 22b is of such size as to freely slidably fit within the internal dimension or configuration of washer element 22a upon shear or failure of the shear section 22c.

The subject fastener 14 is inserted into the aligned holes 10a and 12a in the members 10 and 12 to be fastened together, substantially as shown in FIG. 1 of the drawings. That is, all of the parts are inserted within the aligned holes from the access side adjacent construction member 10.

Thereafter, an ordinary push-pull setting tool is employed to pull on the stem 18 while simultaneously pushing on the sleeve 16 through washer 22. Such tool may take substantially any desired form, but, as related to the instant invention, need not be sophisticated such as to be provided with many different complicated controls, but rather need only be capable of providing sufficient push-pull, action-reaction forces to reach the maximum forces hereinafter described. The members 24 and 26 are merely illustrative of components of such a setting tool, suffice, for purposes of the instant invention, to realize that member 24 is intended to firmly grip stem 18, at the threaded or serrated portion 18k thereof, and member 26 is intended to freely slide relative to stem 18 and to apply a compressive force to the washer 22 and thus to the sleeve 16 as will hereinafter be explained.

With the subject fastener 14 thus positioned, and with the setting tool operable thereon, member 24 is caused to pull on stem 18 while simultaneously anvil member 26 is caused to be pushed with an equal but opposite force.

Ultimately, cylindrical portion 18a is drawn within opening 16a of sleeve 16, to expand or cold form the lower end of sleeve 16 as shown in the drawings, to cause it to firmly engage the hole 12a in member 12. The cylindrical portion 18a of stem 18 is then wire-drawn or reduced in diameter as shown at 18b in FIG. 2 as it is drawn further into opening 16a until the shoulder 18c abutts sleeve shoulder 16c.

Figure 2:
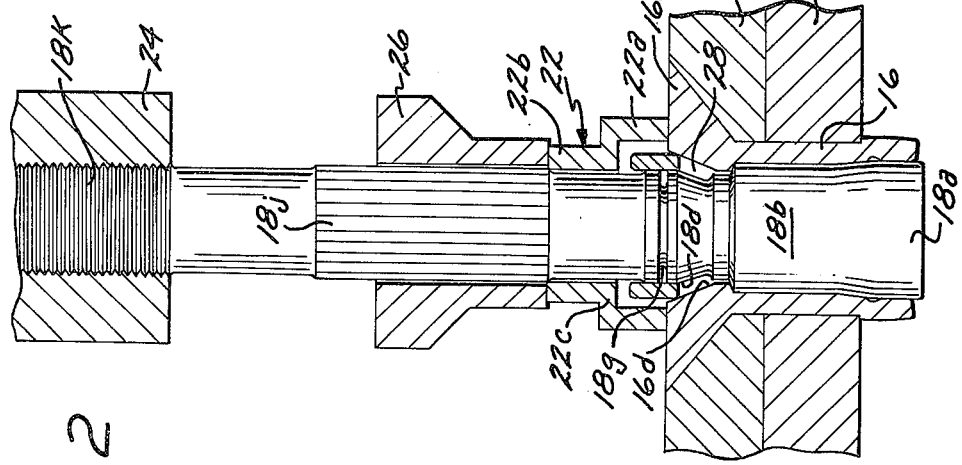
FIG. 2 is a fragmentary sectional view showing the fastener in a second setting position.

As seen in FIG. 2 of the drawings, the anvil member 26 transmits its force through the control and setting washer 22 to the head 16b of sleeve 16. Thus, since the engagement between stem 18 and sleeve 16 is at the lower end thereof, as depicted in the drawings, the stem 18 is placed under tension while the sleeve 16 and washer 22 are placed under compression. These forces are equal and opposite and do not involve the members 10 and 12 to be fastened, so that the installer must urge the fastener into the aligned holes 10a and 12a so that the enlarged head or end portion 16b of sleeve 16 is properly seated. Then, the above explained expansion of the end of sleeve 16 causes the members 10 and 12 to be firmly drawn together.

The two-element control and setting washer 22 is so constructed that the maximum shear load for section or web 22c exceeds the forces necessary to expand the sleeve 16 and pull the stem into the sleeve as above explained. Ultimately, however, the tensile force on stem 18 and the compressive force on washer 22 and sleeve 16 are caused to increase so as to exceed such shear strength. This may be accomplished by engagement of shoulder 18c of stem 18 with an inwardly disposed annular shoulder 16c formed in sleeve 16. When such engagement occurs, the forces applied by the setting tool increase sharply causing the shear strength of web 22c of washer 22 to be exceeded.

At the same time, as shown most clearly in FIG. 2 of the drawing, when shoulder 18c engages shoulder 16c, the stem and sleeve are in proper relation for locking the stem 18 in place. The tapered annular surface 18d of stem 18 is then adjacent to but spaced from a tapered surface 16d formed in sleeve 16. The surfaces 18d are so spaced from each other as to provide an annular tapered cavity 28 therebetween.

Of equal significance in the engagement of shoulder 18c and 16c, is the fact that the breaknotch or reduced section 18g of stem 18 is then in proper relation to the upper end surface of sleeve 16 so that breakage at that reduced section will ultimately provide an installed fastener of pleasing appearance.

Figure 3:
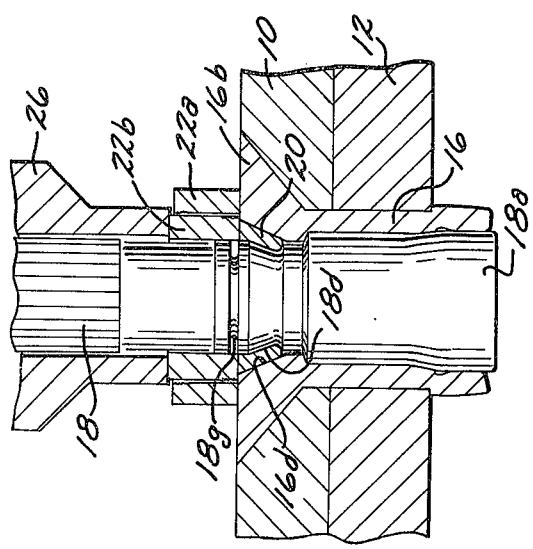
FIG. 3 is a fragmentary sectional view of such fastener in a further position during setting operation.

When such shoulders 18c and 16c engage, any further incremental increase in push-pull force applied by the tool (not shown) causes the shear section 22c of washer 22 to fail, enabling the tool, through member 26, to drive washer element 22b into engagement with locking ring or collar 20, within the washer element 22a, as shown most clearly in FIG. 3 of the drawings. When this occurs, the malleable locking collar 20 is driven into the cavity 28 defined by the surfaces 16d and 18d, such collar being cold formed thereby to prevent disengagement of the stem and sleeve.

Figure 4:
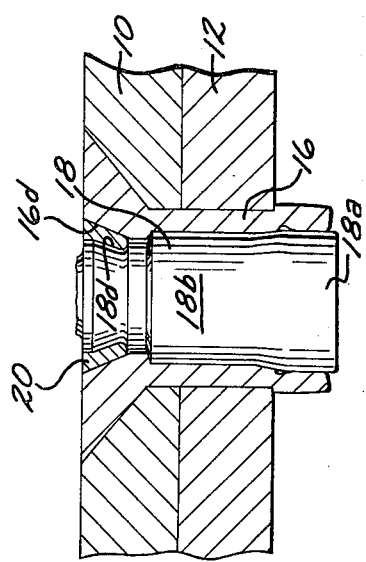
FIG. 4 is a fragmentary sectional view showing the subject fastener installed.

Thereafter, the stem 18 is broken at reduced portion 18g to provide the finished, installed fastener as shown in FIG. 4. The various elements 22a and 22b of washer 22 are then disposed of since they easily fall away from the setting tool with the disposable upper portion of the stem 18.

It is seen that the instant invention provides a single part, namely washer 22 which is both a control member for instigating the locking operation, and is also the setting or driving member for driving the lockring or collar into locking position. As such, it can be engineered and manufactured within close tolerances so that the control function is extremely precise and predetermined, and in no way dependent upon the skill of the operator or installer or upon the idiosyncrasies or special characteristics of the installing tool. Thus, readily available tools which are in use today can be emloyed, and such washer 22 may be employed with various different styles and brands of fasteners, wherein a locking collar is employed.

Although I have shown and described certain specific embodiments of my invention, I am well aware that many modifications thereof are possible.

I claim:

1. A blind fastener for fastening together at least two members comprising in combination, a sleeve adapted for insertion in aligned holes in said members and having a through opening and an enlarged head incapable of passing through said holes, a stem slidable within said through opening of said sleeve and having an enlarged end portion at the end of said sleeve opposite said head, a one-piece washer slidably received upon the stem and including a radially outer element of such size as to be engagable with the head of said sleeve and a radially inner element axially offset from said radially outer element in a direction away from said head and being joined thereto by a breakaway portion, said washer adapted to exert force on said head as a unitary structure with said breakaway portion adapted to fracture in response to a predetermined maximum force to separate the two elements, and a locking member initially separate from both elements of said washer and from said sleeve underlying the radially inner element and being engagable by said radially inner element as a result of and upon said breakaway portion responding to said maximum force to be forced by said radially inner element into cooperating means on said stem and sleeve to lock said stem and sleeve in their relative positions.

2. A blind fastener according to claim 1 wherein said stem is adapted to be gripped by a push-pull blind fastener setting tool to receive a tensile force as a reaction to a compressive force applied to said washer.

3. A blind fastener according to claim 2 wherein said breakaway portion defines the maximum force to be applied to said stem and sleeve.

4. A blind fastener according to claim 3 wherein said washer elements are concentric and are adapted to be forced to substantially coplanar concentric relation upon said tool overcoming said breakaway portion.

5. A blind fastener according to claim 4 wherein said breakaway portion is a shear portion whereby said maximum force is determined by the shear strength of said portion.

6. A blind fastener according to claim 5 wherein said cooperating means on said sleeve and stem comprise cooperating surfaces defining a cavity, and said locking member is a collar to be driven into said cavity by one of said elements when but only when said shear portion of said washer has been overcome.

7. A blind fastener according to claim 6 which further includes engagable surfaces on said stem and sleeve for defining the relative position thereof when said maximum force is applied to said washer and said collar is driven into said cavity.

8. A blind fastener according to claim 7 wherein said collar is annular in shape and is positioned about said stem to be driven by said radially inner washer element upon overcoming the shear portion thereof.

* * * * *